US009708857B2

(12) United States Patent
DiGiovanni

(10) Patent No.: US 9,708,857 B2
(45) Date of Patent: Jul. 18, 2017

(54) POLYCRYSTALLINE COMPACTS INCLUDING NANOPARTICULATE INCLUSIONS, CUTTING ELEMENTS AND EARTH-BORING TOOLS INCLUDING SUCH COMPACTS, AND METHODS OF FORMING SAME

(71) Applicant: Baker Hughes Incorporated, Houston, TX (US)

(72) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 357 days.

(21) Appl. No.: 14/522,339

(22) Filed: Oct. 23, 2014

(65) Prior Publication Data

US 2015/0041224 A1  Feb. 12, 2015

Related U.S. Application Data

(63) Continuation of application No. 13/277,010, filed on Oct. 19, 2011, now Pat. No. 8,893,829.

(Continued)

(51) Int. Cl.
*E21B 10/46* (2006.01)
*E21B 10/55* (2006.01)

(Continued)

(52) U.S. Cl.
CPC ............... *E21B 10/567* (2013.01); *B01J 3/06* (2013.01); *B01J 3/062* (2013.01); *B22F 3/14* (2013.01);

(Continued)

(58) Field of Classification Search
CPC .... E21B 10/46; E21B 2010/545; E21B 10/55; E21B 2010/561; E21B 10/567
See application file for complete search history.

(56) References Cited

U.S. PATENT DOCUMENTS 3,745,623 A   7/1973  Wentorf, Jr. et al.
4,224,380 A   9/1980  Bovenkerk et al.
(Continued)

OTHER PUBLICATIONS

Costescu et al., Ultra-Low Thermal Conductivity in W/Al2O3 Nanolaminates, Science (2004), vol. 303, pp. 989-990.
(Continued)

*Primary Examiner* — Cathleen Hutchins
(74) *Attorney, Agent, or Firm* — TraskBritt

(57) ABSTRACT

A polycrystalline compact comprises a plurality of grains of hard material and a plurality of nanoparticles disposed in interstitial spaces between the plurality of grains of hard material. The nanoparticles have cores of a first material and at least one oxide material on the cores. An earth-boring tool comprises such a polycrystalline compact. A method of forming a polycrystalline compact comprises combining a plurality of hard particles with a plurality of nanoparticles to form a mixture and sintering the mixture to form a polycrystalline hard material comprising a plurality of interbonded grains of hard material. A method of forming a cutting element comprises infiltrating interstitial spaces between interbonded grains of hard material in a polycrystalline material with a plurality of nanoparticles.

20 Claims, 3 Drawing Sheets

Related U.S. Application Data

(60) Provisional application No. 61/408,268, filed on Oct. 29, 2010.

(51) Int. Cl.

| | | |
|---|---|---|
| *E21B 10/567* | (2006.01) | |
| *B01J 3/06* | (2006.01) | |
| *B24D 3/06* | (2006.01) | |
| *B24D 99/00* | (2010.01) | |
| *C22C 26/00* | (2006.01) | |
| *B22F 3/14* | (2006.01) | |
| *E21B 10/00* | (2006.01) | |
| *B24D 18/00* | (2006.01) | |
| *B22F 7/06* | (2006.01) | |
| *B22F 1/00* | (2006.01) | |
| *B22F 5/00* | (2006.01) | |

(52) U.S. Cl.
CPC ........... *B24D 3/06* (2013.01); *B24D 18/0054* (2013.01); *B24D 99/005* (2013.01); *C22C 26/00* (2013.01); *E21B 10/00* (2013.01); *E21B 10/55* (2013.01); *B01J 2203/062* (2013.01); *B01J 2203/0655* (2013.01); *B01J 2203/0685* (2013.01); *B22F 1/0018* (2013.01); *B22F 7/06* (2013.01); *B22F 2005/001* (2013.01); *C22C 2026/006* (2013.01); *C22C 2026/008* (2013.01)

(56) References Cited

U.S. PATENT DOCUMENTS

| | | | |
|---|---|---|---|
| 5,127,923 | A | 7/1992 | Bunting et al. |
| 5,954,147 | A | 9/1999 | Overstreet et al. |
| 7,909,907 | B1 | 3/2011 | Ripley et al. |
| 2005/0230156 | A1 | 10/2005 | Belnap et al. |
| 2007/0049484 | A1 | 3/2007 | Kear et al. |
| 2007/0082190 | A1 | 4/2007 | Endres et al. |
| 2008/0023231 | A1 | 1/2008 | Vail |
| 2008/0209818 | A1 | 9/2008 | Belnap et al. |
| 2009/0290614 | A1 | 11/2009 | Gregory et al. |
| 2010/0122852 | A1 | 5/2010 | Russell et al. |
| 2011/0031034 | A1 | 2/2011 | DiGiovanni et al. |
| 2011/0061942 | A1 | 3/2011 | DiGiovanni |
| 2011/0088954 | A1* | 4/2011 | DiGiovanni ............ C04B 35/52 175/336 |
| 2011/0177322 | A1* | 7/2011 | Ogrin .................... B82Y 30/00 428/325 |
| 2012/0103696 | A1 | 5/2012 | DiGiovanni |

OTHER PUBLICATIONS

Hakim et al., Conformal Nanocoating of Zirconia Nanoparticles by Atomic Layer Deposition in a Fluidized Bed Reactor, Institute of Physics Publishing, Nanotechnology (2005), vol. 16, pp. S375-S381.

Kidalov et al., Thermal Conductivity of Nanocomposites Based on Diamonds and Nanodiamonds, Diamond & Related Materials (2007), vol. 16, pp. 2063-2066.

McLaren, Ryan C., Thermal Conductivity Anisotropy in Molybdenum Disulfide Thin Films, Theses, University of Illinois at Urbana-Champaign, 2009, 90 pages.

Rowe et al., Temperature Control in CBN Grinding, The International Journal of Advanced Manufacturing Technology (1996), vol. 12, pp. 387-392.

International Search Report for International Application No. PCT/US2011/056922 dated Mar. 19, 2012, 3 pages.

International Written Opinion for International Application No. PCT/US2011/056922 dated Mar. 19, 2012, 3 pages.

International Preliminary Report on Patentability for International Application No. PCT/US2011/056922 dated Apr. 30, 2013, 4 pages.

* cited by examiner

POLYCRYSTALLINE COMPACTS INCLUDING NANOPARTICULATE INCLUSIONS, CUTTING ELEMENTS AND EARTH-BORING TOOLS INCLUDING SUCH COMPACTS, AND METHODS OF FORMING SAME

CROSS-REFERENCE TO RELATED APPLICATIONS

This application is a continuation of U.S. patent application Ser. No. 13/277,010, filed Oct. 19, 2011, now U.S Pat. No. 8,893,829, issued Nov. 25, 2014, which application claims the benefit of U.S. Provisional Patent Application Ser. No. 61/408,268, filed Oct. 29, 2010, titled "Polycrystalline Compacts Including Nanoparticulate Inclusions, Cutting Elements and Earth-Boring Tools Including Such Compacts, and Methods of Forming Same," the disclosure of each of which is incorporated herein in its entirety by this reference.

FIELD

The present invention relates generally to polycrystalline compacts, Which may be used, for example, as cutting elements for earth-boring tools, and to methods of forming such polycrystalline compacts, cutting elements, and earth-boring tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements fixedly attached to a bit body of the drill hit, Roller cone earth-boring rotary drill bits may include cones mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), which act as cutting faces of a polycrystalline diamond material. Polycrystalline diamond material is material that includes interbonded grains or crystals of diamond material. In other words, polycrystalline diamond material includes direct, inter-granular bonds between the grains or crystals of diamond material. The terms "grain" and "crystal" are used synonymously and interchangeably herein.

PDC cutting elements are typically formed by sintering and bonding together relatively small diamond grains under conditions of high temperature and high pressure in the presence of a catalyst (e.g., cobalt, iron, nickel, or alloys and mixtures thereof) to form a layer (referred to as a compact or "table") of polycrystalline diamond material on a cutting element substrate. These processes are often referred to as high-temperature/high-pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may diffuse into the diamond grains during sintering and serve as a catalyst material for forming the inter-granular diamond-to-diamond bonds, and the resulting diamond table, from the diamond grains. In other methods, powdered catalyst material may be mixed with the diamond grains prior to sintering the grains together in an HUT process.

Upon formation of a diamond table using an HTHP process, catalyst material may remain in interstitial spaces between the grains of diamond in the resulting PDC. The presence of the catalyst material in the diamond table may contribute to thermal damage in the diamond table when the cutting element is heated during use, due to friction at the contact point between the cutting element and the formation.

PDC cutting elements in which the catalyst material remains in the PDC are generally thermally stable up to a temperature of about $750°$ C., although internal stress within the cutting element may begin to develop at temperatures exceeding about $350°$ C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about $750°$ C. and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about $750°$ C., some of the diamond crystals within the polycrystalline diamond compact may react with the catalyst material causing the diamond crystals to undergo a chemical breakdown or back-conversion to another allotrope of carbon (e.g., graphite) or another carbon-based material. For example, the diamond crystals may graphitize at the diamond crystal boundaries, which may substantially weaken the diamond table. In addition, at extremely high temperatures, some of the diamond crystals may be converted to carbon monoxide and/or carbon dioxide.

In order to reduce the problems associated with differential rates of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the interbonded diamond crystals in the diamond table using, for example, an acid or combination of acids (e.g., aqua regia). All of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about $1,200°$ C. It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having polycrystalline diamond compacts that are more thermally stable relative to non-leached polycrystalline diamond compacts, but that are also relatively less brittle and vulnerable to shear, compressive, and tensile stresses relative to fully leached diamond tables; cutting elements have been provided that include a diamond table in which the catalyst material has been leached from a portion or portions of the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, a polycrystalline compact comprises a plurality of grains of hard material and a plurality of nanoparticles disposed in interstitial spaces between the plurality of grains of hard material. The plurality of nanoparticles has a thermal conductivity less than a thermal conductivity of the plurality of grains of hard material.

In additional embodiments, an earth-boring tool comprises a polycrystalline compact. The polycrystalline compact has a plurality of grains of hard material and a plurality of nanoparticles disposed in interstitial spaces between the grains of hard material. The plurality of nanoparticles has a thermal conductivity less than a thermal conductivity of the plurality of grains of hard material.

A method of forming a polycrystalline compact comprises combining a plurality of hard particles and a plurality of nanoparticles to form a mixture and sintering the mixture to form a polycrystalline hard material comprising a plurality of interbonded grains of hard material. The plurality of nanoparticles have a lower thermal conductivity than the plurality of hard particles.

A method of forming a cutting element comprises infiltrating interstitial spaces between interbonded grains of hard material in a polycrystalline material with a plurality of nanoparticles. The plurality of nanoparticles have a lower thermal conductivity than the interbonded grains of hard material.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of some embodiments of the disclosure when read in conjunction with the accompanying drawings, in which:

DETAILED DESCRIPTION

The illustrations presented herein are not actual views of any particular polycrystalline compact, microstructure of a polycrystalline compact, particle, cutting element, or drill bit, and are not drawn to scale, but are merely idealized representations employed to describe the present disclosure. Additionally, elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bi-center bits, reamers, mills, drag bits, roller cone bits, hybrid bits, and other drilling bits and tools known in the art.

As used herein, the term "particle" means and includes any coherent volume of solid matter having an average dimension of about 2 mm or less. Grains (i.e., crystals) and coated grains are types of particles. As used herein, the term "nanoparticle" means and includes any particle having an average particle diameter of about 500 nm or less. Nanoparticles include grains in a polycrystalline material having an average grain size of about 500 nm or less.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "inter-granular bond" means and includes any direct atomic bond (e.g., covalent, metallic, etc.) between atoms in adjacent grains of material.

As used herein, the term "catalyst material" refers to any material that is capable of catalyzing the formation of inter-granular bonds between grains of hard material during a sintering process (e.g., an HTHP process). For example, catalyst materials for diamond include cobalt, iron, nickel, other elements from Group VIII-A of the periodic table of the elements, and alloys thereof.

As used herein, the term "hard material" means and includes any material having a Knoop hardness value of about 3,000 $Kg_f/mm^2$ (29,420 MPa) or more. Hard materials include, for example, diamond and cubic boron nitride.

As used herein, the term "low thermal conductivity nanoparticle," means and includes a particle comprising a material that exhibits a bulk thermal conductivity of about one hundred watts per meter-Kelvin (100 $Wm^{-1}K^{-1}$) or less at a temperature of 23° C. Low thermal conductivity nanoparticles include, for example, nanoparticles at least partially formed from alumina.

Figure 1A:
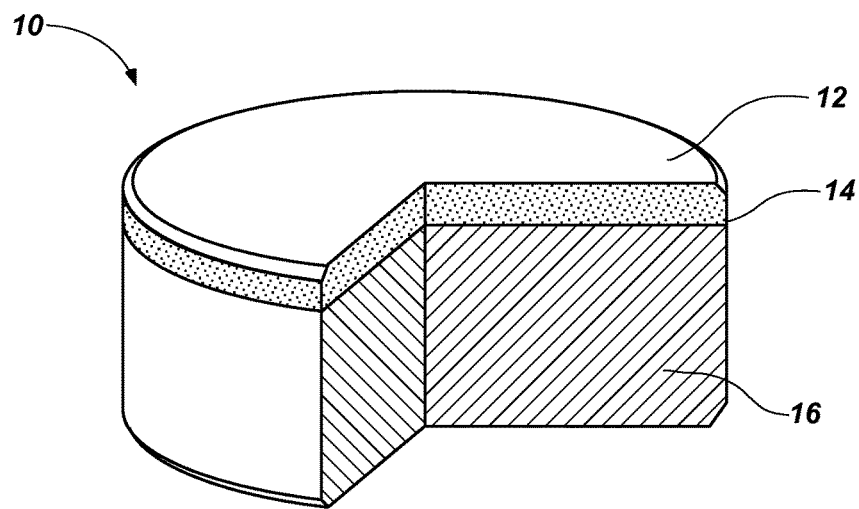
FIG. 1A is a partial cut-away perspective view illustrating an embodiment of a cutting element comprising a polycrystalline compact of the present disclosure.

FIG. 1A is a simplified, partially cut-away perspective view of an embodiment of a cutting element 10 of the present disclosure. The cutting element 10 comprises a polycrystalline compact in the form of a layer of hard polycrystalline material 12, also known in the art as a polycrystalline table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

In some embodiments, the polycrystalline material 12 comprises polycrystalline diamond. In such embodiments, the cutting element 10 may be referred to as a PDC cutting element. In other embodiments, the polycrystalline material 12 may comprise another hard material such as, for example, polycrystalline cubic boron nitride.

Figure 1B:
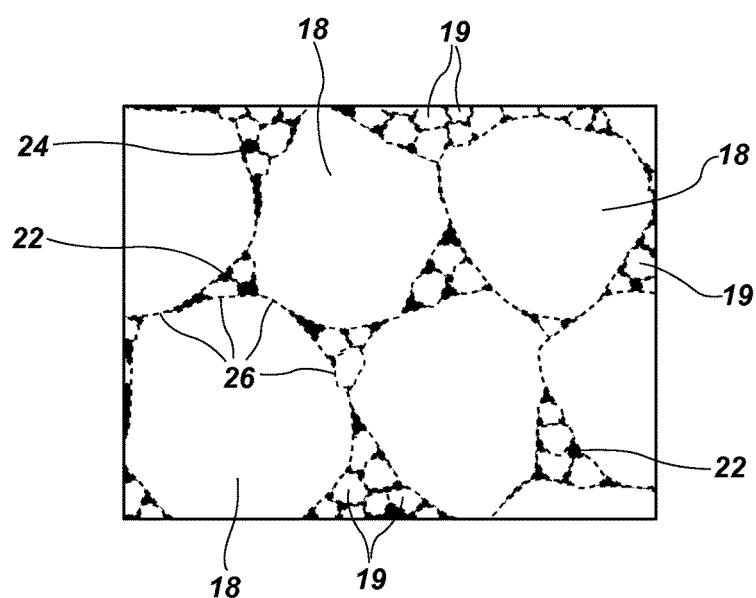
FIG. 1B is a simplified drawing showing how a microstructure of the polycrystalline compact of FIG. 1A may appear under magnification, and illustrates interbonded and interspersed larger and smaller grains of hard material.

FIG. 1B is an enlarged simplified view illustrating how a microstructure of the polycrystalline material 12 (FIG. 1A) of the cutting element 10 may appear under magnification. As discussed in further detail below, the polycrystalline material 12 includes interbonded grains 18 of hard material. The polycrystalline material 12 also includes particles 19 (e.g., nanoparticles or micron-sized particles) disposed in interstitial spaces 22 between the interbonded grains 18 of hard material. These particulate inclusions in the polycrystalline material 12 may lower an overall thermal conductivity of the polycrystalline material 12. Nanoparticulate inclusions (i.e., nanoparticles) having a lower thermal conductivity than at least the interbonded grains 18 of hard material may be incorporated into the polycrystalline material 12 such that the overall thermal conductivity of the polycrystalline material 12 is reduced.

The overall reduction of thermal conductivity in the polycrystalline material 12 (FIG. 1A) may lead to an increase in thermal stability of the cutting element 10. The particles 19 having a low thermal conductivity may act to insulate or slow the distribution of heat to at least a portion of the polycrystalline material 12. For example, during drilling of an earth formation, a temperature of an exterior of the polycrystalline material 12 may increase due to frictional forces between the polycrystalline material 12 and the earth formation. Because of the reduced overall thermal conductivity of the polycrystalline material 12, the increased temperature may be at least partially contained to the exterior of the polycrystalline material 12. This may help to maintain an interior portion of the polycrystalline material 12 at a lower and more stable temperature. Accordingly, by insulating at least a portion of the polycrystalline material 12, the insulated portion of the polycrystalline material 12 may be relatively less likely to degrade during use due to thermal-expansion mismatch between the different elements within the polycrystalline material 12. Furthermore, in embodiments in which the hard material comprises diamond, a decrease of heat transferred to at least a portion of the polycrystalline material 12 may decrease the susceptibility of the diamond to graphitize.

In some embodiments, and as shown in FIG. 1B, the grains 18 of hard material in the polycrystalline material 12 may have a uniform, mono-modal grain size distribution.

In additional embodiments, the grains 18 of the polycrystalline material 12 may have a multi-modal (e.g., bi-modal, tri-modal, etc.) grain size distribution. For example, the polycrystalline material 12 may comprise a multi-modal grain size distribution as disclosed in at least one of U.S. Pat. No. 8,579,052, issued Nov. 12, 2013, titled "Polycrystalline Compacts Including In-Situ Nucleated Grains, Earth-Boring Tools Including Such Compacts, and Methods of Forming Such Compacts and Tools;" U.S. Pat. No. 8,727,042, issued May 20, 2014; titled "Polycrystalline Compacts Having Material Disposed in Interstitial Spaces Therein, and Cutting Elements Including Such Compacts;" and U.S. Pat. No. 8,496,076, issued Jul. 30, 2013, titled "Polycrystalline Compacts Including Nanoparticulate Inclusions, Cutting Elements and Earth-Boring Tools Including Such Compacts, and Methods of Forming Such Compacts;" the disclosure of each of which is incorporated herein in its entirety by this reference.

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline material 12 (e.g., a polished and etched surface of the polycrystalline material 12). Commercially available vision systems are often used with such microscopy systems, and these vision systems are capable of measuring the average grain size of grains within a microstructure.

In some embodiments, at least some of the grains 18 of hard material may comprise in-situ nucleated grains 18 of hard material, as disclosed in U.S. Pat. No. 8,579,052, previously incorporated herein by reference.

The interstitial spaces 22 between the grains 18 of hard material may be at least partially filled with low thermal conductivity particles 19 and with a catalyst material.

The low thermal conductivity particles 19 disposed in the interstitial spaces 22 between the interbonded grains 18 of hard material may comprise a material having a lower thermal conductivity than the interbonded grains 18 of hard material. For example, the interbonded grains 18 of hard material may have a thermal conductivity of between about 500 $Wm^{-1}K^{-1}$ and about 2600 $Wm^{-1}K^{-1}$ at 23° C. The low thermal conductivity particles 19 may comprise a material that exhibits a thermal conductivity of about 100 $Wm^{-1}K^{-1}$ or less at 23° C. in bulk form, or even about 50 $Wm^{-1}K^{-1}$ or less at 23° C. in bulk form. In one embodiment, the particles 19 may have a thermal conductivity of about 1 $Wm^{-1}K^{-1}$ or less at 23° C. In another embodiment, the particles 19 may have a thermal conductivity of about 0.2 $Wm^{-1}K^{-1}$ or less at 23° C., such as particles having nanoscale layers of alumina and tungsten. The material of the particles 19 may have a bulk thermal conductivity of less than about 20% of the thermal conductivity of the interbonded grains 18, less than about 5% of the thermal conductivity of the interbonded grains 18, or even less than about 1% of the thermal conductivity of the interbonded grains 18. The approximate bulk thermal conductivities at 23° C. for some materials are shown below in Table 1.

TABLE 1

| Material | Approximate Thermal Conductivity at 23° C. ($Wm^{-1}K^{-1}$) |
| --- | --- |
| Diamond (type IIa) | 2300 |
| Cubic boron nitride | varies - 1300 is max theoretical bulk |
| Diamond (type I) | 895 |
| Platinum | 716 |
| Silicon carbide | 490 |
| Copper | 401 |
| Tungsten | 174 |
| Silicon | 148 |
| Tungsten carbide | 84 |
| Alumina (polycrystalline) | 36 |
| Titanium carbide | 31 |
| Titanium | 21 |
| Titanium dioxide (polycrystalline) | 8.4 |
| Zirconia | 2.0 |
| Silicon dioxide (polycrystalline) | 1.4 |
| Selenium | 0.5 |
| Molybdenum disulfide | 0.2 |

Thermal conductivity of a material may vary as a function of temperature. For example, the thermal conductivity of some materials may decrease as temperature increases. The thermal conductivity of other materials may increase as temperature increases. A low thermal conductivity material may be selected based on its thermal conductivity at ambient room temperature (e.g., 23° C.), thermal conductivity at an operating temperature (e.g., 750° C.) or thermal conductivity at any other temperature.

The low thermal conductivity material of the particles 19 may comprise, for example, one or more of elementary metals (e.g., commercially pure tungsten), metal alloys (e.g., tungsten alloys), refractory metals, intermetallic compounds, ceramics (e.g., carbides, nitrides, oxides), and combinations thereof. As particular non-limiting examples, the low thermal conductivity particles 19 may comprise at least one of alumina and zirconia.

Figure 2:
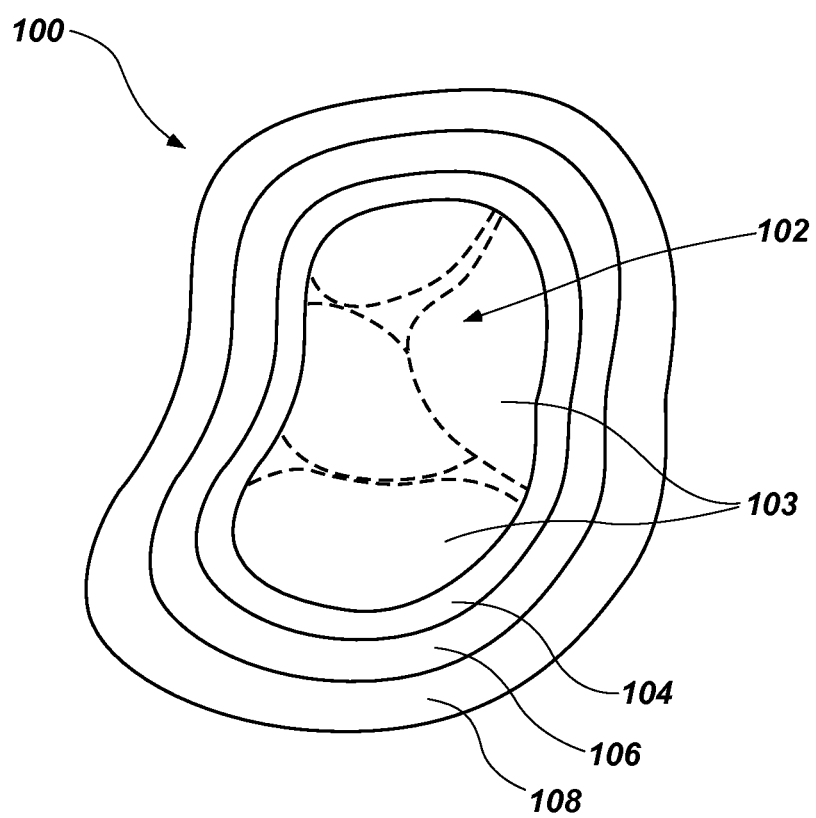
FIG. 2 includes an enlarged view of one embodiment of a low thermal conductivity nanoparticle of the present disclosure.

In some embodiments, the low thermal conductivity particles 19 may, at least initially (prior to a sintering process used to form the polycrystalline material 12), comprise at least two materials, as does a low thermal conductivity particle 100 illustrated in FIG. 2. For example, the low thermal conductivity particle 100 may include a core 102 comprising a first material and at least one coating 104, 106, 108 comprising at least one other material. At least one of the core 102 and the at least one coating 104, 106, 108 comprises a low thermal conductivity material. The core 102 may comprise, for example, at least one of alumina, zirconia, zirconium, tungsten, tungsten carbide, titanium, titanium carbide, and silicon. The core 102 may comprise a single nanoparticle or the core 102 may comprise a plurality or cluster of smaller nanoparticles 103. The core 102, comprising one particle or a plurality of nanoparticles 103, may have a total average particle size of between about twenty-five nanometers (25 nm) and about seventy-five nanometers (75 nm). For example, in one embodiment, the core 102 may comprise a single nanoparticle of the plurality of nanoparticles 103 of tungsten carbide having an average particle size of about twenty-five nanometers (25 nm). In another embodiment, the core 102 may comprise a plurality of nanoparticles 103 having an average particle size of about two nanometers (2 nm) to about ten nanometers (10 nm), which have agglomerated to form the core 102 having an average particle size of about fifty nanometers (50 nm) to about seventy-five nanometers (75 nm). The plurality of nanoparticles 103 may have a uniform average particle size, or the plurality of nanoparticles 103 may have differing average particle sizes. In yet further embodiments, the plurality of nanoparticles 103 forming the core 102 may comprise at least two materials. For example, in one embodiment, at least one nanoparticle of the plurality of nanoparticles 103 comprises tungsten carbide and at least one nanoparticle of the plurality of nanoparticles 103 comprises alumina. A nano-scale microstructure of two or more materials may exhibit a lower thermal conductivity than any of the component materials alone. For example, a nano-layered composite of alumina and tungsten may have a thermal conductivity of about 0.2 $Wm^{-1}K^{-1}$.

Each coating of the at least one coating 104, 106, 108 may have a thickness of between about two nanometers (2 nm) and about five nanometers (5 nm), such as a thickness of about two nanometers (2 nm) to about three nanometers (3 nm). In some embodiments, each of the at least one coating 104, 106, 108 may be conformally deposited on the core 102. In other embodiments, one or more of the coatings 104, 106, 108 may be formed partially over the core 102, or may be formed having variable thicknesses. In some embodiments, multiple coatings of the same material may be formed over the core 102, For example, a first coating 104, a second coating 106, and a third coating 108 may be formed over the core 102, each coating 104, 106, 108 comprising alumina, In alternative embodiments, at least two coatings 104, 106, 108 comprising different materials may be formed on the core 102. For example, in one embodiment, the first coating 104 comprising alumina may be formed over the core 102, the second coating 106 comprising zirconia may be formed over the first coating 104, and the third coating 108 comprising alumina may be formed over the second coating 106, While FIG. 2 is illustrated as having three coatings 104, 106, 108 over the core 102, it is understood that any number of coatings may be applied to the core 102 such that the total particle comprises a nanoparticle, In some embodiments, coatings 104, 106, 108 may be applied such that the resulting particle 100 is micron sized (i.e., larger than 500 nm). In further embodiments, micron-sized clusters formed of at least two nanoparticles, like the particle 100 of FIG. 2, may be conglomerated and coated either individually or in combination and incorporated into the polycrystalline material 12.

By way of example and not limitation, processes such as liquid sol-gel, flame spray pyrolysis, chemical vapor deposition (CVD), physical vapor deposition (PVD) (e.g., sputtering), and atomic layer deposition (ALD), may be used to provide the at least one coating 104, 106, 108 on the core 102. Other techniques that may be used to provide the at least one coating 104, 106, 108 on the core 102 include colloidal coating processes, plasma coating processes, microwave plasma coating processes, physical admixture processes, van der Waals coating processes, and electrophoretic coating processes. In some embodiments, the at least one coating 104, 106, 108 may be provided on the core 102 in a fluidized bed reactor (not shown).

Referring again to FIGS. 1A and 1B, the volume occupied by the low thermal conductivity particles 19 in the polycrystalline material 12 may be in a range extending from about 0.01% to about 50% of the volume of the polycrystalline material 12. The weight percentage of the particles 19 in the polycrystalline material 12 may be in a range extending from about 0.1% to about 10% by weight.

Some of the low thermal conductivity particles 19 may be mechanically bonded to the grains 18 of hard material after the sintering process (e.g., an HPHT process) used to form the polycrystalline material 12.

In some embodiments, the polycrystalline material 12 may also include a catalyst material 24 disposed in interstitial spaces 22 between the interbonded grains 18 of the polycrystalline hard material and between the particles 19. The catalyst material 24 may comprise a catalyst used to catalyze formation of inter-granular bonds 26 between the grains 18 of hard material in the polycrystalline material 12. In other embodiments, however, the interstitial spaces 22 between the grains 18 and the particles 19 in some or all regions of the polycrystalline material 12 may be at least substantially free of such a catalyst material 24. In such embodiments, the interstitial spaces 22 may comprise voids filled with gas (e.g., air).

In embodiments in which the polycrystalline material 12 comprises polycrystalline diamond, the catalyst material 24 may comprise a Group VIII-A element iron, cobalt, or nickel) or an alloy thereof, and the catalyst material 24 may comprise between about one tenth of one percent (0.1%) and about ten percent (10%) by volume of the hard polycrystalline material 12. In additional embodiments, the catalyst material 24 may comprise a carbonate material such as a carbonate of one or more of magnesium, calcium, strontium, and barium. Carbonates may also be used to catalyze the formation of polycrystalline diamond.

The layer of hard polycrystalline material 12 of the cutting element 10 may be formed using a high-temperature/high-pressure (HTHP) process. Such processes, and systems for carrying out such processes, are generally known in the art. In some embodiments, the polycrystalline material 12 may be formed on a supporting substrate 16 (as shown in FIG. 1A) of cemented tungsten carbide or another suitable substrate material in a conventional HTHP process of the type described, by way of non-limiting example, in U.S. Pat. No. 3,745,623, titled "Diamond Tools for Machining," issued Jul. 17, 1973, or may be formed as a freestanding polycrystalline material 12 (i.e., without the supporting substrate 16) in a similar conventional HTHP process as described, by way of non-limiting example, in U.S. Pat. No. 5,127,923, titled "Composite Abrasive Compact Having High Thermal Stability," issued Jul. 7, 1992, the disclosure of each of which is incorporated herein in its entirety by this reference. In some embodiments, the catalyst material 24 may be supplied from the supporting substrate 16 during an HTHP process used to form the polycrystalline material 12. For example, the substrate 16 may comprise a cobalt-cemented tungsten carbide material. The cobalt of the cobalt-cemented tungsten carbide may serve as the catalyst material 24 during the HTHP process. Furthermore, in some embodiments, the low thermal conductivity particles 19 also may be supplied from the supporting substrate 16 during an HTHP process used to form the polycrystalline material 12. For example, the substrate 16 may comprise a cobalt-cemented tungsten carbide material that also includes low thermal conductivity particles 19 therein. The cobalt and the low thermal conductivity particles 19 of the substrate 16 may diffuse into the interstitial spaces 22 between the grains 18 of hard material.

To form the polycrystalline material 12 in an HTHP process, a particulate mixture comprising particles (e.g., grains) of hard material and low thermal conductivity particles 100 (FIG. 2) may be subjected to elevated temperatures (e.g., temperatures greater than about 1,000° C.) and elevated pressures (e.g., pressures greater than about 5.0 gigapascals (GPa)) to form inter-granular bonds 26 between the particles of hard material and the particles 100, thereby forming the interbonded grains 18 of hard material and the particles 19 of the polycrystalline material 12. In some embodiments, the particulate mixture may be subjected to a pressure greater than about 6.0 GPa and a temperature greater than about 1,500° C. in the HTHP process.

In embodiments in which a carbonate catalyst material 24 (e.g., a carbonate of one or more of magnesium, calcium, strontium, and barium) is used to catalyze the formation of polycrystalline diamond, the particulate mixture may be subjected to a pressure greater than about 7.7 GPa and a temperature greater than about 2,000° C.

The particulate mixture may comprise hard particles for forming the grains 18 of hard material previously described herein. The particulate mixture may also comprise at least one of particles of catalyst material 24, and low thermal conductivity particles 100 for forming the particles 19 in the polycrystalline material 12. In some embodiments, the particulate mixture may comprise a powder-like substance. In other embodiments, however, the particulate mixture may be carried by (e.g., on or in) another material, such as a paper or film, which may be subjected to the HTHP process. An organic binder material also may be included with the particulate mixture to facilitate processing.

Thus, in some embodiments, the low thermal conductivity particles 100 may be admixed with the hard particles used to form the grains 18 to form a particulate mixture, which then may be sintered in an HPHT process.

In some embodiments, the low thermal conductivity particles 100 may be admixed with the hard particles used to form the grains 18 of hard material prior to a modified HPHT sintering process used to synthesize a nanoparticulate composite that includes the low thermal conductivity particles 100 and nanoparticles of hard material.

In some embodiments, the low thermal conductivity particles 100 may be grown on, attached to, adhered to, or otherwise connected to the hard particles used to form the grains 18 prior to the sintering process. The low thermal conductivity particles 100 may be attached to the hard particles by functionalizing exterior surfaces of at least one of the low thermal conductivity particles 100 and the hard particles. After attaching the low thermal conductivity particles 100 to the hard particles, the resulting particulate mixture may be subjected to an HPHT process to form a polycrystalline material 12 comprising grains of hard material 18 and low thermal conductivity particles 19, as described above.

In additional embodiments, the low thermal conductivity particles 100 may be combined with the catalyst material 24 prior to the sintering process. For example, the low thermal conductivity particles 100 may be grown on, attached to, adhered to, or otherwise connected to particles of catalyst material, and the coated particles of catalyst material may be combined with hard particles to form the particulate mixture prior to the sintering process. The low thermal conductivity particles 100 may be attached to the particles of catalyst material by functionalizing exterior surfaces of at least one of the low thermal conductivity particles 100 and the catalyst particles. After attaching the low thermal conductivity particles 100 to the catalyst particles and admixing with hard particles, the resulting particulate mixture may be subjected to an HPHT process to form a polycrystalline material 12, as described above.

In some embodiments, the low thermal conductivity particles 100 may be grown on, attached, adhered, or otherwise connected to both particles of hard material and particles of catalyst material, and the coated particles may be combined to form the particulate mixture.

As previously mentioned, a particulate mixture that includes hard particles for forming the interbonded grains 18 of hard material, low thermal conductivity particles 100, and, optionally, a catalyst material 24 (for catalyzing the formation of inter-granular bonds 26 between the grains 18), may be subjected to an HTHP process to form a polycrystalline material 12. After the HTHP process, catalyst material 24 (e.g., cobalt) and low thermal conductivity particles 19 may be disposed in at least some of the interstitial spaces 22 between the interbonded grains 18 of hard material.

Optionally, the catalyst material 24 may be removed from the polycrystalline material 12 after the HTHP process using processes known in the art. However, the removal of the catalyst material 24 may also result in the removal of at least a portion of the low thermal conductivity particles 19, which may be undesirable. For example, a leaching process may be used to remove the catalyst material 24 and/or the low thermal conductivity particles 19 from the interstitial spaces 22 between the grains 18 of hard material in at least a portion of the polycrystalline material 12. By way of example and not limitation, a portion of the polycrystalline material 12 may be leached using a leaching agent and process such as those described more fully in, for example, U.S. Pat. No. 5,127,923, previously incorporated herein by reference, and U.S. Pat. No. 4,224,380, titled "Temperature Resistant Abrasive Compact and Method for Making Same," issued Sep. 23, 1980, the disclosure of which is incorporated herein in its entirety by this reference. Specifically, aqua regia (a mixture of concentrated nitric acid ($HNO_3$) and concentrated hydrochloric acid (HCl)) may be used to at least substantially remove catalyst material 24 and/or low thermal conductivity nanoparticles from the interstitial spaces 22. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the polycrystalline material 12 for a period of about two (2) hours to about sixty (60) hours, depending upon the size of the body of polycrystalline material 12. After leaching the polycrystalline material 12, the interstitial spaces 22 between the interbonded grains 18 of hard material within the polycrystalline material 12 subjected to the leaching process may be at least substantially free of catalyst material 24 used to catalyze formation of inter-granular bonds 26 between the grains in the polycrystalline material 12. Only a portion of the polycrystalline material 12 may be subjected to the leaching process, or the entire body of the polycrystalline material 12 may be subjected to the leaching process.

In additional embodiments of the present disclosure, low thermal conductivity particles 19, 100 may be introduced into the interstitial spaces 22 between interbonded grains 18 of hard, polycrystalline material 12 after the catalyst material 24 and any other material in the interstitial spaces 2.2 has been removed from the interstitial spaces 22 (e.g., by a leaching process). For example, after subjecting a polycrystalline material 12 to a leaching process, low thermal conductivity particles 19, 100 may be introduced into the interstitial spaces 22 between the grains 18 of hard material in the polycrystalline material 12. Low thermal conductivity particles 19, 100 may be suspended in a liquid (e.g., water and/or another solvent) to form a suspension and the leached polycrystalline material 12 may be soaked in the suspension to allow the liquid and the low thermal conductivity particles 19, 100 to infiltrate into the interstitial spaces 22. The liquid (and the low thermal conductivity particles 19, 100 suspended therein) may be drawn into the interstitial spaces 22 by capillary forces. In some embodiments, pressure may be applied to the liquid to facilitate infiltration of the liquid suspension into the interstitial spaces 22.

After infiltrating the interstitial spaces 22 with the liquid suspension, the polycrystalline material 12 may be dried to remove the liquid from the interstitial spaces 22, leaving behind the low thermal conductivity particles 19, 100 therein. Optionally, a thermal treatment process may be used to facilitate the drying process. Alternatively, a liquid precursor may be chosen such that the liquid containing low thermal conductivity nanoparticles 103 will infiltrate the interstitial spaces 22 and solidify, holding the nanoparticles 103 in place after drying, curing, or other treatment.

The polycrystalline material 12 then may be subjected to a thermal process (e.g., a standard vacuum furnace sintering process) to at least partially sinter the low thermal conductivity particles 19, 100 within the interstitial spaces 22 in the polycrystalline material 12. Such a process may be carried out below any temperature that might be detrimental to the polycrystalline material 12.

Figure 3:
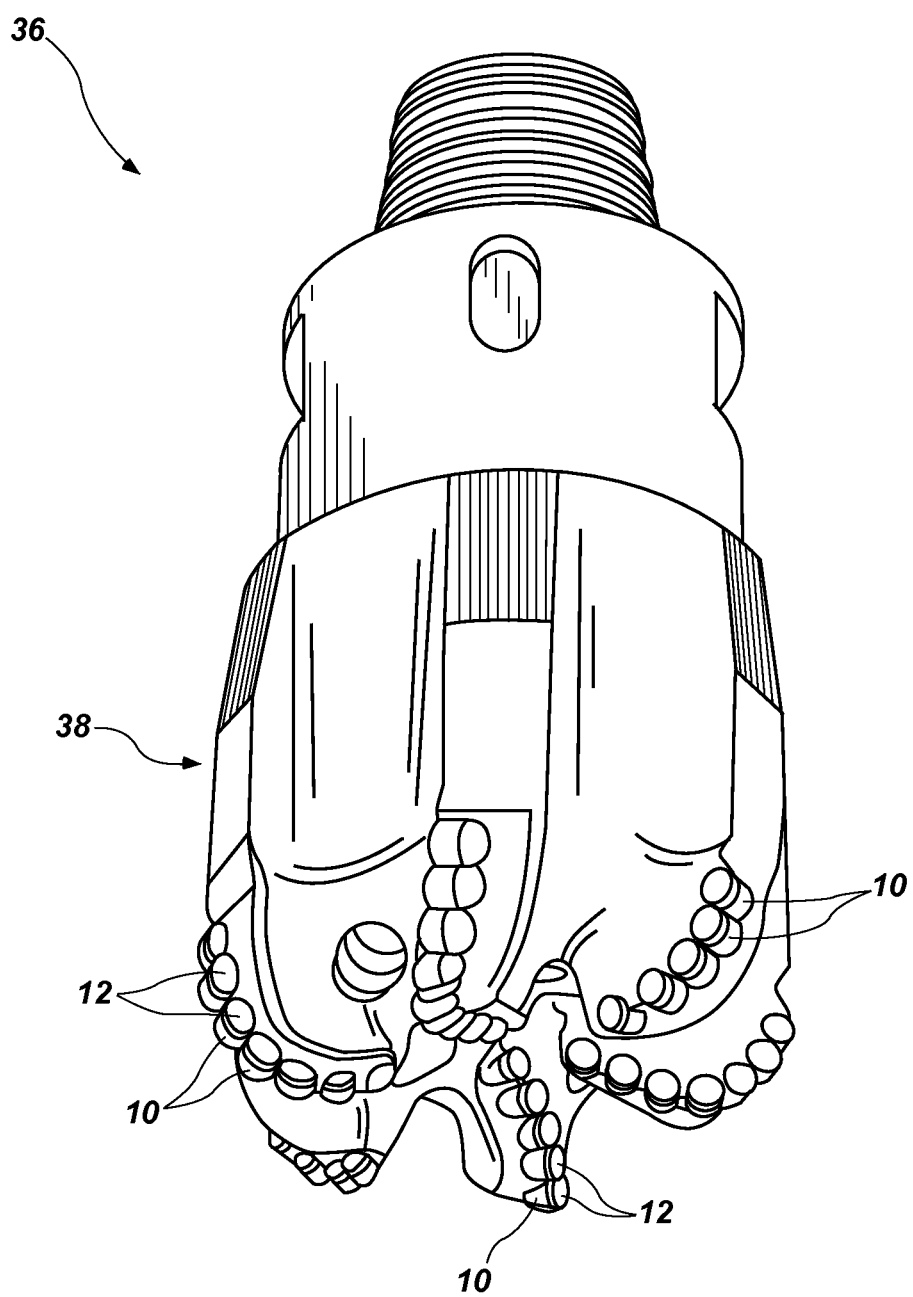
FIG. 3 is a perspective view of an embodiment of a fixed-cutter earth-boring rotary drill bit that includes a plurality of polycrystalline compacts like that shown in FIGS. 1A and 1B.

Embodiments of cutting elements 10 of the present disclosure that include a polycrystalline compact comprising polycrystalline material 12 formed as previously described herein, such as the cutting element 10 illustrated in FIG. 1A, may be formed and secured to an earth-boring tool such as, for example, a rotary drill bit, a percussion bit, a coring bit, an eccentric bit, a reamer tool, a milling tool, etc., for use in forming wellbores in subterranean formations. As a non-limiting example, FIG. 3 illustrates a fixed cutter type earth-boring rotary drill bit 36 that includes a plurality of cutting elements 10, each of which includes a polycrystalline compact comprising polycrystalline material 12 as previously described herein. The earth-boring rotary drill bit 36 includes a bit body 38, and the cutting elements 10, which include polycrystalline compacts 12 (see FIG. 1A), are bonded to the bit body 38. The cutting elements 10 may be brazed (or otherwise secured) within pockets formed in the outer surface of the bit body 38.

Polycrystalline hard materials that include low thermal conductivity nanoparticles in interstitial spaces between the interbonded grains of hard material, as described hereinabove, may exhibit improved thermal stability, improved mechanical durability, or both improved thermal stability and improved mechanical durability relative to previously known polycrystalline hard materials. By including the low thermal conductivity nanoparticles in the interstitial spaces between the interbonded grains of hard material, less catalyst material may be disposed in interstitial spaces between the grains in an ultimate polycrystalline hard material, and the thermal conductivity of the polycrystalline material may be reduced, which may improve one or both of the thermal stability and the mechanical durability of the ultimate polycrystalline hard material.

Additional non-limiting example embodiments of the disclosure are described below.

Embodiment 1: A polycrystalline compact comprising a plurality of grains of hard material having a first thermal conductivity at 23° C. and a plurality of nanoparticles having a second thermal conductivity at 23° C. disposed in interstitial spaces between the plurality of grains of hard material, The second thermal conductivity is less than about 0.2 times the first thermal conductivity.

Embodiment 2: The polycrystalline compact of Embodiment 1, wherein the plurality of grains of hard material comprises a plurality of grains of diamond.

Embodiment 3: The polycrystalline compact of Embodiment 1 or Embodiment 2, wherein the second thermal conductivity is less than about 50 $Wm^{-1}K^{-1}$.

Embodiment 4: The polycrystalline compact of Embodiment 3, wherein the second thermal conductivity is about 0.2 $Wm^{-1}K^{-1}$.

Embodiment 5: The polycrystalline compact of any of Embodiment 1 through Embodiment 4, further comprising a catalyst material in the interstitial spaces between the plurality of grains of hard material.

Embodiment 6: The polycrystalline compact of any of Embodiment 1 through Embodiment 5, wherein the plurality of nanoparticles comprises alumina, Embodiment 7: The polycrystalline compact of any of Embodiment 1 through Embodiment 6, wherein each nanoparticle of the plurality of nanoparticles comprises a core comprising a first material and at least one coating on the core. The at least one coating comprises a second, different material.

Embodiment 8: The polycrystalline compact of Embodiment 7, wherein the core comprises at least two particles.

Embodiment 9: The polycrystalline compact of Embodiment 7 or Embodiment 8, wherein the core comprises tungsten carbide and the at least one coating on the core comprises alumina.

Embodiment 10: The polycrystalline compact of any of Embodiment 7 through Embodiment 9, wherein the at least one coating on the core comprises a first coating comprising alumina, a second coating comprising zirconia, and a third coating comprising alumina.

Embodiment 11: The polycrystalline compact of any of Embodiment 1 through Embodiment 10, wherein the plurality of nanoparticles occupies from about 0.01% to about 50% by volume of the polycrystalline compact.

Embodiment 12: The polycrystalline compact of any of Embodiment 1 through Embodiment 11, further comprising a substrate bonded to the plurality of grains of hard material.

Embodiment 13: An earth-boring tool comprising a polycrystalline compact. The polycrystalline compact has a plurality of grains of hard material having a first thermal conductivity at 23° C. and a plurality of nanoparticles having a second thermal conductivity at 23° C. disposed in interstitial spaces between the plurality of grains of hard material. The second thermal conductivity is less than about 0.2 times the first thermal conductivity.

Embodiment 14: The earth-boring tool of Embodiment 13, wherein the earth-boring tool is a fixed-cutter rotary drill bit.

Embodiment 15: A method of forming a polycrystalline compact, comprising combining a plurality of hard particles having a first thermal conductivity at 23° C. and a plurality of nanoparticles having a second thermal conductivity at 23° C. to form a mixture and sintering the mixture to form a polycrystalline hard material comprising a plurality of interbonded grains of hard material. The second thermal conductivity is less than about 0.2 times the first thermal conductivity.

Embodiment 16: The method of Embodiment 15, wherein combining a plurality of hard particles and a plurality of nanoparticles to form a mixture comprises combining a plurality of diamond particles and a plurality of nanoparticles to form the mixture.

Embodiment 17: The method of Embodiment 15 or Embodiment 16, wherein combining a plurality of hard particles having a first thermal conductivity at 23° C. and a plurality of nanoparticles having a second thermal conductivity at 23° C. to form a mixture comprises combining a plurality of hard particles with nanoparticles comprising a material having a thermal conductivity less than about 50 $Wm^{-1}K^{-1}$.

Embodiment 18: The method of any of Embodiments 15 through 17, wherein combining a plurality of hard particles having a first thermal conductivity at 23° C. and a plurality of nanoparticles having a second thermal conductivity at 23° C. to form a mixture comprises combining a plurality of hard particles with nanoparticles comprising alumina.

Embodiment 19: The method of any of Embodiments 15 through 18, further comprising adding a catalyst to the mixture, the catalyst selected to promote formation of intergranular bonds between the grains of hard material.

Embodiment 20: The method of any of Embodiments 15 through 19, wherein sintering the mixture comprises sintering the mixture in an HTHP process.

Embodiment 21: The method of any of Embodiments 15 through 20, further comprising forming a nanoparticle of the plurality of nanoparticles comprising coating a core comprising a first material with a second material. The second material comprises the material having a lower thermal conductivity than the plurality of hard particles.

Embodiment 22: A method of forming a cutting element, comprising infiltrating interstitial spaces between interbonded grains of hard material in a polycrystalline material with a plurality of nanoparticles. The plurality of nanoparticles have a thermal conductivity at 23° C. of less than about 20% of a thermal conductivity at 23° C. of the interbonded grains of hard material.

Embodiment 23: The method of Embodiment 22, wherein infiltrating interstitial spaces between interbonded grains of hard material in a polycrystalline material with a plurality of nanoparticles comprises infiltrating interstitial spaces between interbonded diamond grains with a plurality of nanoparticles, Embodiment 24: The method of Embodiment 22 or Embodiment 23, wherein infiltrating interstitial spaces between interbonded grains of hard material in a polycrystalline material with a plurality of nanoparticles comprises infiltrating interstitial spaces between interbonded grains of hard material in a polycrystalline material with a material having a thermal conductivity of less than about 50 $Wm^{-1}K^{-1}$.

Embodiment 25: The method of any of Embodiments 22 through 24, wherein infiltrating interstitial spaces between interbonded grains of hard material in a polycrystalline material with a plurality of nanoparticles comprises infiltrating interstitial spaces between interbonded grains of hard material in a polycrystalline material with nanoparticles comprising alumina.

While the present disclosure has been described herein with respect to certain embodiments, those of ordinary skill in the art will recognize and appreciate that it is not so limited, Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor. Further, embodiments of the disclosure have utility with different and various bit profiles, as well as various cutting element types and configurations.

What is claimed is:

1. A polycrystalline compact, comprising:
   a plurality of grains of hard material; and
   a plurality of nanoparticles disposed in interstitial spaces between the plurality of grains of hard material, wherein each nanoparticle of the plurality comprises:
   a core comprising a first material; and
   at least one oxide material on the core, the at least one oxide material different from the first material.

2. The polycrystalline compact of claim 1, wherein the plurality of grains of hard material comprises a plurality of grains of diamond.

3. The polycrystalline compact of claim 1, wherein the grains of hard material exhibit a first thermal conductivity at 23° C. and the nanoparticles exhibit a second thermal conductivity at 23° C., and wherein the second thermal conductivity is less than about 50 $Wm^{-1}K^{-1}$.

4. The polycrystalline compact of claim 1, further comprising a catalyst material in the interstitial spaces between the plurality of grains of hard material.

5. The polycrystalline compact of claim 1, wherein the grains of hard material exhibit a first thermal conductivity at 23° C. and the nanoparticles exhibit a second thermal conductivity at 23° C., wherein the second thermal conductivity is less than about 0.2 times the first thermal conductivity.

6. The polycrystalline compact of claim 1, wherein the core comprises at least two particles.

7. The polycrystalline compact of claim 1, wherein the core comprises tungsten carbide and the at least one oxide material on the core comprises alumina.

8. The polycrystalline compact of claim 5, wherein the at least one oxide material on the core comprises a first oxide material comprising alumina, a second oxide material comprising zirconia, and a third oxide material comprising alumina.

9. The polycrystalline compact of claim 1, wherein the plurality of nanoparticles occupies from about 0.01% to about 50% by volume of the polycrystalline compact.

10. The polycrystalline compact of claim 1, further comprising a substrate bonded to the plurality of grains of hard material.

11. An earth-boring tool comprising the polycrystalline compact of claim 1.

12. The earth-boring tool of claim 11, wherein the earth-boring tool is a fixed-cutter rotary drill bit.

13. A method of forming a polycrystalline compact, comprising:
combining a plurality of hard particles with a plurality of nanoparticles to form a mixture, each nanoparticle of the plurality of nanoparticles comprising:
a core comprising a first material and;
at least one oxide material on the core, the at least one oxide material different from the first material; and
sintering the mixture to form a polycrystalline hard material comprising a plurality of interbonded grains of hard material.

14. The method of claim 13, wherein combining a plurality of hard particles with a plurality of nanoparticles to form a mixture comprises combining a plurality of diamond particles with a plurality of nanoparticles to form the mixture.

15. The method of claim 13, wherein combining a plurality of hard particles with a plurality of nanoparticles to form a mixture comprises combining a plurality of hard particles exhibiting a first thermal conductivity at 23° C. with nanoparticles exhibiting a second thermal conductivity at 23° C., wherein the second thermal conductivity is less than about 0.2 times the first thermal conductivity.

16. The method of claim 15, wherein combining a plurality of hard particles having a first thermal conductivity at 23° C. with a plurality of nanoparticles having a second thermal conductivity at 23° C. to form a mixture comprises combining a plurality of hard particles with nanoparticles comprising a material having a thermal conductivity less than about 50 $Wm^{-1}K^{-1}$.

17. The method of claim 13, further comprising adding a catalyst to the mixture, the catalyst selected to promote formation of inter-granular bonds between the grains of hard material.

18. A method of forming a cutting element comprising a polycrystalline compact, the method comprising infiltrating interstitial spaces between interbonded grains of hard material in a polycrystalline material with a plurality of nanoparticles, each nanoparticle of the plurality of nanoparticles comprising:
a core comprising a first material and;
at least one oxide material on the core, the at least one oxide material different from the first material.

19. The method of claim 18, wherein infiltrating interstitial spaces between interbonded grains of hard material in a polycrystalline material with a plurality of nanoparticles comprises infiltrating interstitial spaces between interbonded diamond grains with a plurality of nanoparticles.

20. The method of claim 18, wherein infiltrating interstitial spaces between interbonded grains of hard material in a polycrystalline material with a plurality of nanoparticles comprises infiltrating interstitial spaces between interbonded grains of hard material in a polycrystalline material with a material having a thermal conductivity of less than about 50 $Wm^{-1}K^{-1}$.

* * * * *

UNITED STATES PATENT AND TRADEMARK OFFICE
CERTIFICATE OF CORRECTION

PATENT NO.       : 9,708,857 B2                     Page 1 of 1
APPLICATION NO.  : 14/522339
DATED            : July 18, 2017
INVENTOR(S)      : Anthony A. DiGiovanni It is certified that error appears in the above-identified patent and that said Letters Patent is hereby corrected as shown below:

In the Specification

| | | |
|---|---|---|
| Column 1, | Line 37, | change "the drill hit," to --the drill bit.-- |
| Column 2, | Line 3, | change "in a HUT" to --in a HTHP-- |
| Column 7, | Line 60, | change "the core 102, For" to --the core 102. For-- |
| Column 7, | Line 63, | change "alumina, In" to --alumina. In-- |
| Column 8, | Line 3, | change "coating 106, While" to --coating 106. While-- |
| Column 8, | Line 6, | change "a nanoparticle, In" to --a nanoparticle. In-- |
| Column 8, | Line 53, | change "element iron," to --element (e.g., iron,-- |
| Column 11, | Line 23, | change "spaces 2.2 has" to --spaces 22 has-- |
| Column 12, | Line 30, | change "of hard material," to --of hard material.-- |
| Column 12, | Line 48, | change "comprises alumina," to --comprises alumina.-- |
| Column 14, | Line 3, | change "nanoparticles," to --nanoparticles.-- |
| Column 14, | Line 22, | change "limited, Rather," to --limited. Rather,-- |

Signed and Sealed this
Twenty-seventh Day of February, 2018

Andrei Iancu
*Director of the United States Patent and Trademark Office*